United States Patent [19]
Washio et al.
[11] Patent Number: 4,475,112
[45] Date of Patent: Oct. 2, 1984

[54] METHOD OF DISTRIBUTING DATA FOR DRIVING A THERMAL PRINTING HEAD

[75] Inventors: Michiyoshi Washio, Shiga; Hiromu Kuramoto, Ohsaka, both of Japan

[73] Assignee: Jujo Engineering Co., Ltd., Kyoto, Japan

[21] Appl. No.: 435,034

[22] Filed: Oct. 18, 1982

[30] Foreign Application Priority Data

Oct. 20, 1981 [JP] Japan ................................ 56-167379

[51] Int. Cl.³ ................................................ G01D 15/10
[52] U.S. Cl. ................................. 346/1.1; 346/76 PH
[58] Field of Search ........................... 346/1.1, 76 PH; 400/120; 219/216

[56] References Cited

U.S. PATENT DOCUMENTS 4,141,018 2/1979 Mizuguchi ........................ 346/76 R
4,216,481 8/1980 Hakoyama ...................... 346/76 PH
4,322,733 3/1982 Moriguchi ...................... 346/76 PH
4,366,489 12/1982 Yamaguchi .................... 346/76 PH

*Primary Examiner*—Joseph W. Hartary
*Attorney, Agent, or Firm*—Spensley Horn Jubas & Lubitz

[57] ABSTRACT

A thermal printing head comprises an array of heating elements divided into two blocks each having alternate pairs of two adjacent heating elements, the two blocks being further divided into eight subblocks. The pairs of two adjacent heating elements are supplied with electric power through power feed lines each shared by such a pair of two adjacent heating elements. Two adjacent heating elements belonging to the two blocks are drivable by a single driver. Therefore, the number of the power feed lines and the drivers can be reduced. The eight subblocks are driven two at a time in one cycle of operation, and hence can be energized by a limited allowable current supplied to the thermal printing head.

3 Claims, 6 Drawing Figures

METHOD OF DISTRIBUTING DATA FOR DRIVING A THERMAL PRINTING HEAD

BACKGROUND OF THE INVENTION

The present invention relates to a method of distributing data for driving a facsimile thermal printing head, and more particularly to a method of distributing data for a facsimile thermal printing head composed of an array of heating elements every two of which have a common power feed line and a common data input line.

Conventional facsimile systems employ a thermal printing head comprising an array of heating elements each having its own power feed line and data input line, the heating elements being divided into eight blocks, for example, from one end of the array. Input picture element data is supplied successively to the blocks from the array end. The size of each heating element block is dependent on how great the ability of the thermal head to be supplied with electric power is.

The above method of supplying input data is applicable only to the thermal head having heating elements respectively having their own power feed lines and data input lines. The thermal head of the above construction is disadvantageous in that it is quite tedious and time-consuming to bond the power feed lines and data input lines respectively to the heating elements. With a great many lines connected to the heating elements, the thermal head tends to be defective or malfunction during operation.

SUMMARY OF THE INVENTION

With the foregoing problems in view, it is an object of the present invention to provide a method of distributing data to a thermal printing head having a total number of power feed lines and data input lines reduced to half of that of lines in conventional thermal heads by providing every two heating elements with a common power feed line and a common data input line in order to reduce the number of fabrication steps and frequency of occurence of malfunctions of the thermal printing head.

According to the present invention, a thermal printing head comprises an array of heating elements divided into two blocks each having alternate pairs of two adjacent heating elements, the two blocks being further divided into eight subblocks. The pairs of two adjacent heating elements are supplied with electric power through power feed lines each shared by such a pair of two adjacent heating elements. Two adjacent heating elements belonging to the two blocks are drivable by a single driver. Therefore, the number of the power feed lines and the drivers can be reduced. The power feed lines and data input lines can be bonded to the heating elements in a less tedious and time-consuming process, and the thermal printing head thus fabricated is less likely to malfunction during operation. The eight subblocks are driven two at a time in one cycle of operation, and hence can be energized by a limited allowable current supplied to the thermal printing head.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
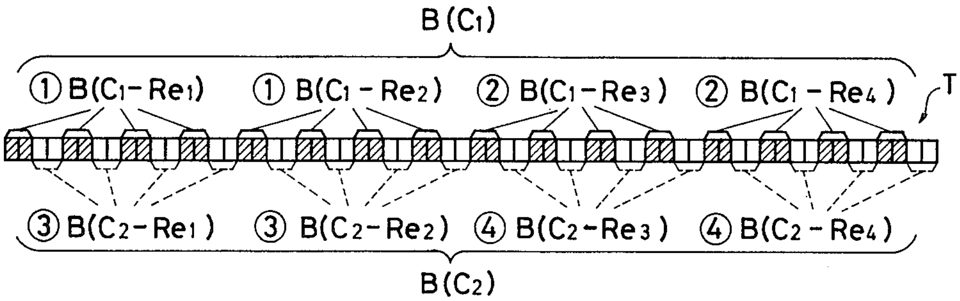
FIG. 1 is a diagram illustrative of an array of heating elements of a thermal printing head which are divided into blocks.
Figure 2:
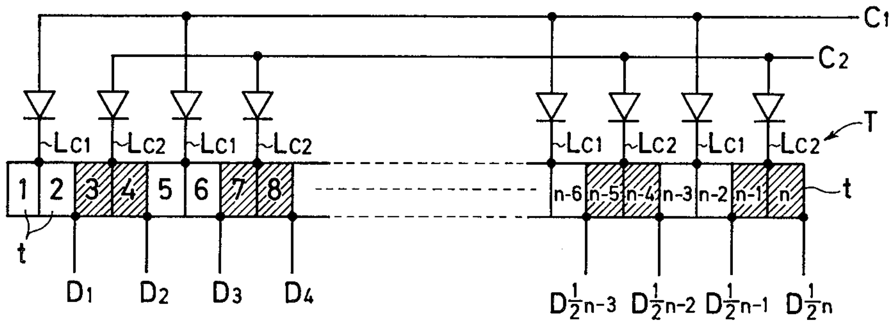
FIG. 2 is a wiring diagram showing power feed lines and driver lines connected to the thermal printing head of FIG. 1.
Figure 3:
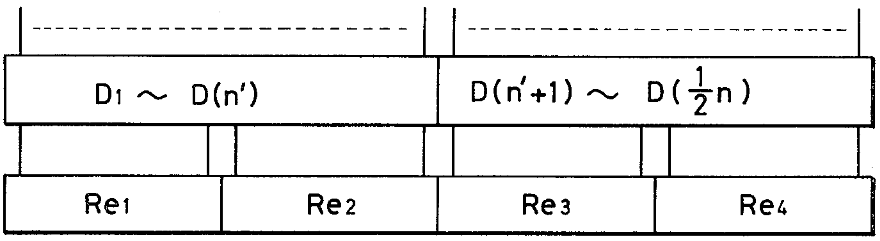
FIG. 3 is a diagram showing drivers and shift registers.

As shown in FIG. 1, a thermal printing head T is composed of an array of heating elements divided into two blocks $B(C_1)$, $B(C_2)$ each composed of alternate pairs of two adjacent heating elements. The blocks $B(C_1)$ comprises hatched heating elements and the block $B(C_2)$ comprises white heating elements. As illustrated in FIG. 2, the blocks $B(C_1)$, $B(C_2)$ are supplied with electric power from different power supplies $C_1$, $C_2$ through power feed lines $LC_1$, $LC_2$ each shared by each pair of adjacent heating elements in one of the blocks $B(C_1)$, $B(C_2)$.

The blocks $B(C_1)$, $B(C_2)$ are further divided into a total of eight blocks $B(C_1\text{-}Re_1)$, $B(C_1\text{-}Re_2)$, $B(C_1\text{-}Re_3)$, $B(C_1\text{-}Re_4)$, and $B(C_2\text{-}Re_1)$, $B(C_2\text{-}Re_2)$, $B(C_2\text{-}Re_3)$, $B(C_2\text{-}Re_4)$, respectively.

The heating elements of the thermal printing head T is driven by a plurality of drivers $D_1$–$D(n')$. $D(n'+1)$–$D(n/2)$ each shared by two adjacent heating elements that belong respectively to the blocks $B(C_1)$, $B(C_2)$, as shown in FIG. 2. The drivers $D_1$–$D(n')$ are provided with shift registers $Re_1$, $Re_2$, and the drivers $D(n'+1)$–$D(n/2)$ are provided with shift registers $Re_3$, $Re_4$. The reference characters $Re_1$, $Re_2$, $Re_3$, $Re_4$ in the eight subblocks correspond to the registers $Re_1$, $Re_2$, $Re_3$, $Re_4$, respectively.

Items of data on received picture elements delivered by serial transmission are divided into data items to be supplied to the blocks $B(C_1)$, $B(C_2)$ of the heating elements t, and the divided information is further divided into data items to be delivered to the eight smaller blocks $B(C_1\text{-}Re_1)$, $B(C_1\text{-}Re_2)$, $B(C_1\text{-}Re_3)$, $B(C_1\text{-}Re_4)$, $B(C_2\text{-}Re_1)$, $B(C_2\text{-}Re_2)$, $B(C_2\text{-}Re_3)$, $B(C_2\text{-}Re_4)$. The divided data items are supplied to the smaller blocks 1. $B(C_1\text{-}Re_1)$, $B(C_1\text{-}Re_2)$, 2. $B(C_1\text{-}Re_3)$, $B(C_1\text{-}Re_4)$, 3. $B(C_2\text{-}Re_1)$, $B(C_2\text{-}Re_2)$, 4. $B(C_2\text{-}Re_3)$, $B(C_2\text{-}Re_4)$ of the heating elements t in the order named for recording data on a recording medium held in contact with the heating elements t.

The order of recording the divided information will be described in more detail with emphasis put on the relationship between the drivers $D_1$–$D(n')$, $D(n'+1)$–$D(n/2)$ and the shift registers $Re_1$, $Re_2$, $Re_3$, $Re_4$.

(i) The data items to be supplied to the blocks $B(C_1\text{-}Re_1)$, $B(C_1\text{-}Re_2)$ are delivered to the shift registers $Re_1$, $Re_2$. (ii) The drivers $D_1$–$D(n')$ corresponding to the shift registers $Re_1$, $Re_2$ are driven to record the data items with the blocks $B(C_1\text{-}Re_1)$, $B(C_1\text{-}Re_2)$, and simultaneously the data items to be supplied to the blocks $B(C_1\text{-}Re_3)$, $B(C_1\text{-}Re_4)$ are delivered to the shift registers $Re_3$, $Re_4$. (iii) The drivers $D(n'+1)$–$D(n/2)$ corresponding to the shift registers $Re_3$, $Re_4$ are driven to record the data items with the blocks $B(C_1$-$Re_3)$, $B(C_1$-$Re_4)$, and simultaneously the data items to be supplied to the blocks $B(C_2$-$Re_1)$, $B(C_2$-$Re_2)$ are delivered to the shift registers $Re_1$, $Re_2$. (iv) The drivers $D_1$–$D(n')$ are driven to record the data items with the blocks $B(C_2$-$Re_1)$, $B(C_2$-$Re_2)$, and simultaneously the data items to be supplied to the blocks $B(C_2$-$Re_3)$, $B(C_2$-$Re_4)$ are delivered to the shift registers $Re_3$, $Re_4$. (v) The drivers $D(n'+1)$–$D(n/2)$ are driven to record the data items with the blocks $B(C_2$-$Re_3)$, $B(C_2$-$Re_4)$. Recording along one line is thus completed. The foregoing cycle of steps (i) through (v) is repeated to successively record received picture element data on recording paper.

The heating elements t of the thermal head T are available is a total number n of 1,728 or 2,048. Where $n=2,048$, data for eight 256-bit registers can be received, and the four shift registers $Re_1$, $Re_2$, $Re_3$, $Re_4$ may advantageously be used twice in one cycle by energizing two registers at a time for writing and reading information.

A quarter of the total number of heating elements are driven at a time as described above since there is a certain limitation on the allowable current that can be supplied to the thermal head.

Figure 4:
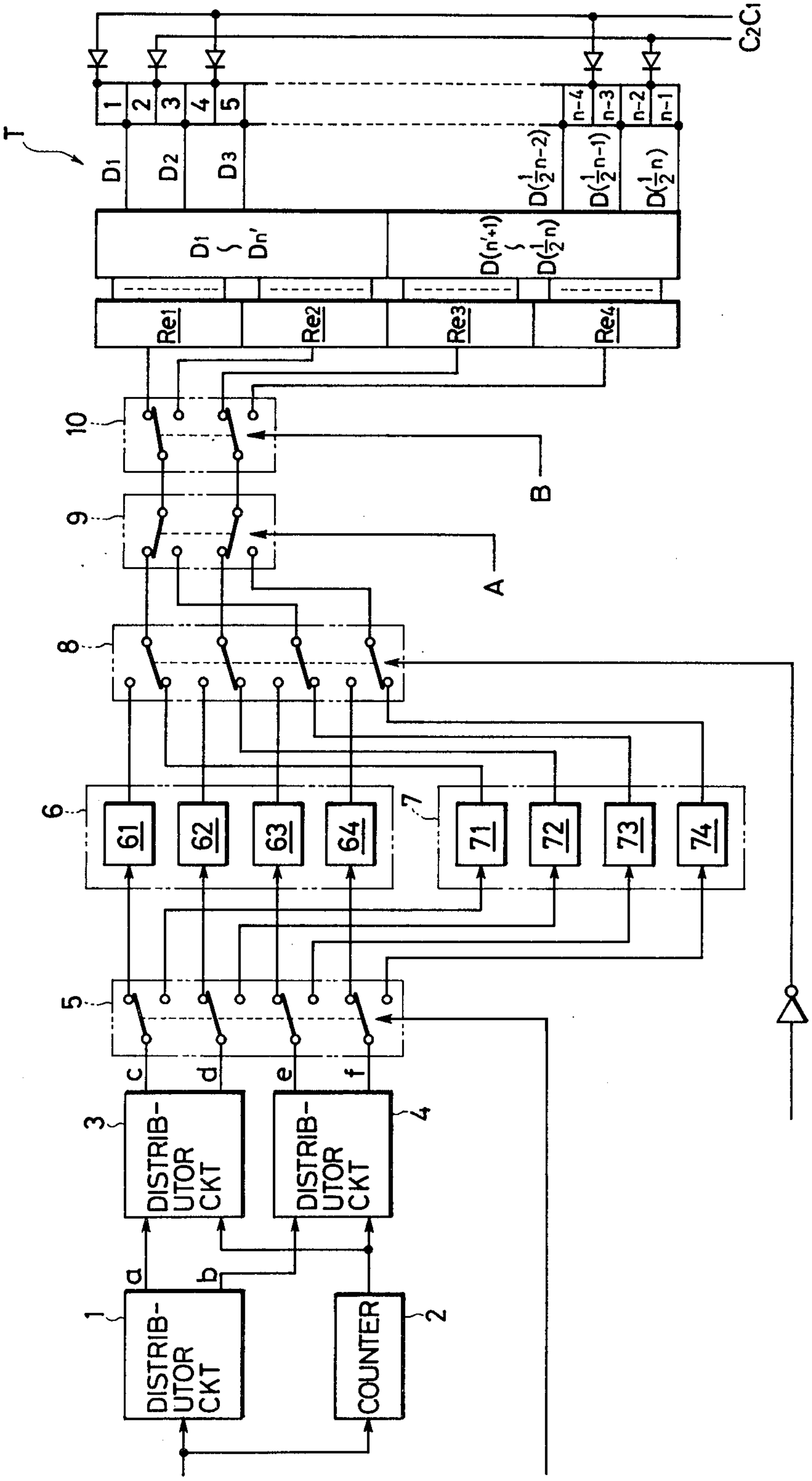
FIG. 4 is a block diagram of an apparatus for carrying out the method of the present invention.

FIG. 4 is illustrative of an apparatus for supplying data items to the shift registers $Re_1$, $Re_2$, $Re_3$, $Re_4$ in the order (i), (ii), (iii), (iv) for the eight blocks of the thermal head T.

The apparatus of FIG. 4 includes a distributor circuit 1 supplied with picture element data items received by serial transmission and delivers output data a to be fed to the block $B(C_1)$ and output data b to be fed to the block $B(C_2)$. A counter 2 serves to control the number of items of data to be distributed.

The output data items a, b are supplied respectively to a pair of second distributor circuits 3, 4. The distributor circuit 3 delivers output data c to the blocks $B(C_1$-$Re_1)$, $B(C_1$-$Re_3)$ and output data d to the blocks $B(C_1$-$Re_2)$, $B(C_1$-$Re_4)$. The distributor circuit 4 delivers output data e to the blocks $B(C_2$-$Re_1)$, $B(C_2$-$Re_3)$ and output data f to the blocks $B(C_2$-$Re_2)$, $B(C_2$-$Re_4)$.

Figure 5:
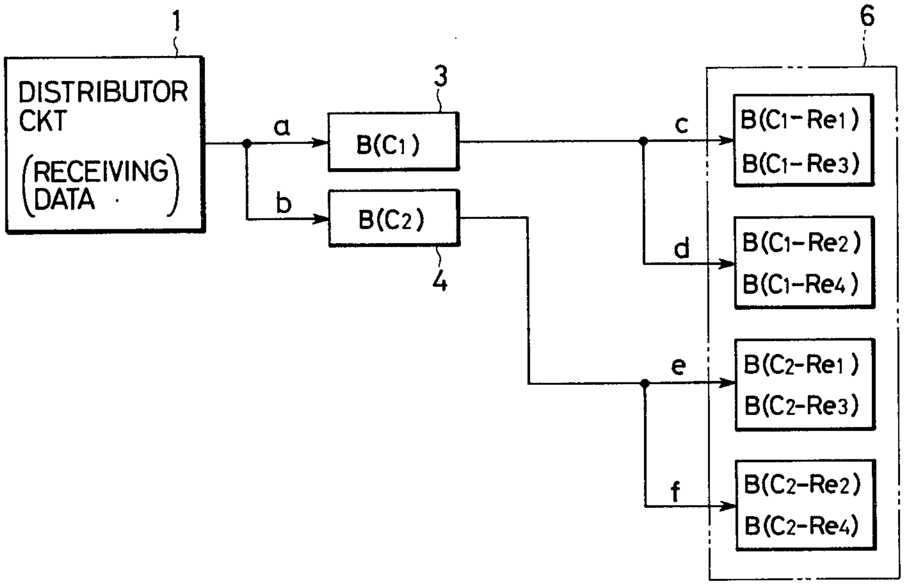
FIG. 5 is a diagram illustrative of the manner in which received data is distributed.

A pair of memories 6, 7 are composed of memory units 61, 62, 63, 64 and 71, 72, 73, 74, respectively, for storing the four data items c, d, e, f to be divided into eight data items. The memory units 61 through 64 and 71 through 74 thus store data items which cannot be transferred to the shift registers at the same time. For example, the memory unit 61 stores the data c to be transferred to the shift registers $Re_1$, $Re_3$. However, these two data items will never be transmitted to the registers $Re_1$, $Re_3$ at the same time. The memories 6, 7 operate complementarily with each other. Thus, when data is read out of the memory 6, data is written into the memory 7, and conversely when data is read out of the memory 7, data is written into the memory 6. The manner in which received data items are distributed to the distributors 1, 3, 4 and the memory 6 or 7 is illustrated in FIG. 5.

Data selectors 5, 8 are provided in front of and behind the memories 6, 7 for mutually opposite switching action to write and read data items into and out of the memories 6, 7. More specifically, when data items are delivered from the memory 6 to the heating elements t, the data selector 8 is switched to select the memory 6, and the data selector 5 is switched to select the memory 7 to feed the latter with received data. After data for one line has been recorded, the data selectors 5, 8 are reversed to write data into the memory 6 and read data out of the memory 7.

The data selector 8 is followed by data selectors 9, 10. The data selector 9 is responsive to a signal A for effecting switching between data transfer to those heating elements t which are connected to the power supply $C_1$ and data transfer to those heating elements t which are connected to the power supply $C_2$. The data selector 10 selects the shift registers $Re_1$, $Re_2$ or the shift registers $Re_3$, $Re_4$ at a time in response to a signal B.

Operation of the data selectors 9, 10 will now be described with reference to the order of driving the thermal head T.

(i) The data selector 9 selects the memory units 61, 62 (for the block $B(C_1)$), and the data selector 10 selects the shift registers $Re_1$, $Re_2$. At this time, the memory unit 61 stores data items for the blocks $B(C_1$-$Re_1)$, $B(C_1$-$Re_3)$, and the memory unit 62 stores data items for the blocks $B(C_1$-$Re_2)$, $B(C_1$-$Re_4)$. Only the data items for the blocks $B(C_1$-$Re_1)$, $B(C_1$-$Re_2)$ are transferred to the shift registers $Re_1$, $Re_2$, respectively.

(ii) The data selector 9 selects the memory units 61, 62 (for the block $B(C_1)$), and the data selector 10 selects the shift registers $Re_3$, $Re_4$. The data items for the blocks $B(C_1$-$Re_3)$, $B(C_1$-$Re_4)$, that is, the data items which have remained in the step (i) are transferred to the shift registers $Re_3$, $Re_4$, respectively.

(iii) The data selector 9 selects the memory units 63, 64 (for the block $B(C_2)$), and the data selector 10 selects the shift registers $Re_1$, $Re_2$. At this time, the memory unit 63 stores data items for the blocks $B(C_2$-$Re_1)$, $B(C_2$-$Re_3)$, and the memory unit 64 stores data items for the blocks $B(C_2$-$Re_2)$, $B(C_2$-$Re_4)$. Only the data items for the blocks $B(C_2$-$Re_1)$, $B(C_2$-$Re_2)$ are transferred to the shift registers $Re_1$, $Re_2$, respectively.

(iv) The data selector 9 selects the memory units 63, 64 (for the block $B(C_2)$), and the data selector 10 selects the shift registers $Re_3$, $Re_4$. The data items for the blocks $B(C_2$-$Re_3)$, $B(C_2$-$Re_4)$, that is, the data items which have remained in the step (i) are transferred to the shift registers $Re_3$, $Re_4$, respectively.

Figure 6:
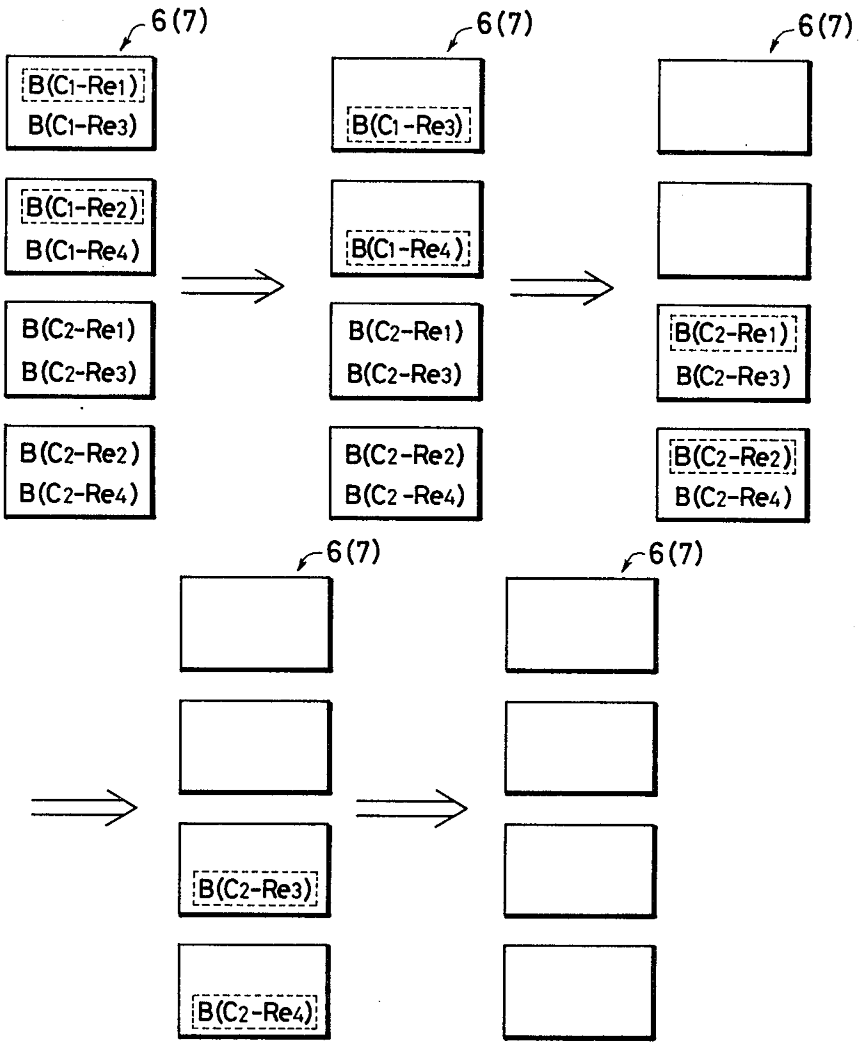
FIG. 6 is a diagram showing the manner in which distributed data is supplied as an input.

FIG. 6 illustrates the manner in which data items are successively transferred from the memory 6 or 7 to the four shift registers $Re_1$, $Re_2$, $Re_3$, $Re_4$ for the thermal head T according to the steps (i) through (iv). The data items enclosed by the broken lines are successively transferred to the shift registers.

Although a certain preferred embodiment has been shown and described, it should be understood that many changes and modifications may be made therein without departing from the scope of the appended claims.

What is claimed is:

1. A method of distributing data for driving a thermal printing head composed of an array of heating elements characterized in that the heating elements are divided into a pair of blocks each having alternate pairs of two adjacent heating elements, said two blocks are further divided into eight subblocks, and the pairs of two adjacent heating elements are supplied with electric power through power feed lines each shared by such a pair of two adjacent heating elements so that the two adjacent heating elements belonging to the two blocks are drivable by a single driver.

2. A method of distributing data for driving a thermal printing head composed of an array of heating elements divided into a pair of blocks $B(C_1)$, $B(C_2)$ each having alternate pairs of two adjacent heating elements, said blocks $B(C_1)$, $B(C_2)$ being further divided into eight subblocks $B(C_1\text{-}Re_1)$, $B(C_1\text{-}Re_2)$, $B(C_1\text{-}Re_3)$, $B(C_1\text{-}Re_4)$, and $B(C_2\text{-}Re_1)$, $B(C_2\text{-}Re_2)$, $B(C_2\text{-}Re_3)$, $B(C_2\text{-}Re_4)$, respectively, a group of drivers $D_{1\text{-}D(n'),\ D(n'}+1)\text{-}D(n/2)$ each connected to two adjacent heating elements belonging to said blocks $B(C_1)$, $B(C_2)$, and four shift registers $Re_1$, $Re_2$, $Re_3$, $Re_4$ connected to said drivers, said method comprising the steps of:

(a) dividing received picture element data into data items to be supplied to said eight subblocks;

(b) delivering the data items to be supplied to said subblocks $B(C_1\text{-}Re_1)$, $B(C_1\text{-}Re_2)$ to said shift registers $Re_1$, $Re_2$;

(c) driving said drivers $D_{1\text{-}D(n')}$ *corresponding to said shift registers* $Re_1$, $Re_2$ to record the data items with said subblocks $B(C_1\text{-}Re_1)$, $B(C_1\text{-}Re_2)$, and simultaneously delivering the data items to be supplied to said subblocks $B(C_1\text{-}Re_3)$, $B(C_1\text{-}Re_4)$ to said shift registers $Re_3$, $Re_4$;

(d) driving said drivers $D(n'+1)\text{-}D(n/2)$ corresponding to said shift registers $Re_3$, $Re_4$ to record the data items with said subblocks $B(C_1\text{-}Re_3)$, $B(C_1\text{-}Re_4)$, and simultaneously delivering the data items to be supplied to said subblocks $B(C_2\text{-}Re_1)$, $B(C_2\text{-}Re_2)$ to said shift registers $Re_1$, $Re_2$;

(e) driving said drivers $D_1\text{-}D(n')$ to record the data items with said subblocks $B(C_2\text{-}Re_1)$, $B(C_2\text{-}Re_2)$, and simultaneously delivering the data items to be supplied to said subblocks $B(C_2\text{-}Re_3)$, $B(C_2\text{-}Re_4)$ to said shift registers $Re_3$, $Re_4$; and (f) driving said drivers $D(n'+1)\text{-}D(n/2)$ to record the data items with said subblocks $B(C_2\text{-}Re_3)$, $B(C_2\text{-}Re_4)$, whereby the data items can be distributed and recorded in the order of the steps (b) through (f).

3. A method of distributing data for driving a thermal printing head composed of an array of heating elements divided into a pair of blocks $B(C_1)$, $B(C_2)$ each having alternate pairs of two adjacent heating elements, said blocks $B(C_1)$, $B(C_2)$ being further divided into eight subblocks $B(C_1\text{-}Re_1)$, $B(C_1\text{-}Re_2)$, $B(C_1\text{-}Re_3)$, $B(C_1\text{-}Re_4)$, and $B(C_2\text{-}Re_1)$, $B(C_2\text{-}Re_2)$, $B(C_2\text{-}Re_3)$, $B(C_2\text{-}Re_4)$, respectively, a group of drivers $D_1\text{-}D(n')$, $D(n'+1)\text{-}D(n/2)$ each connected to two adjacent heating elements belonging to said blocks $B(C_1)$, $B(C_2)$, and four shift registers $Re_1$, $Re_2$, $Re_3$, $Re_4$ connected to said drivers, said method comprising the steps of:

(a) dividing received picture element data into data items to be supplied to said eight subblocks, and storing in four memory units data items each pair of which is to be transferred to two of said subblocks which will not be driven at the same time;

(b) delivering the data items to be supplied to said subblocks $B(C_1\text{-}Re_1)$, $B(C_1\text{-}Re_2)$ to said shift registers $Re_1$, $Re_2$ from selected two of said memory units;

(c) driving said drivers $D_1\text{-}D(n')$ corresponding to said shift registers $Re_1$, $Re_2$ to record the data items with said subblocks $B(C_1\text{-}Re_1)$, $B(C_1\text{-}Re_2)$, and simultaneously delivering the data items to be supplied to said subblocks $B(C_1\text{-}Re_3)$, $B(C_1\text{-}Re_4)$ to said shift registers $Re_3$, $Re_4$ from said selected two of said memory units;

(d) driving said drivers $D(n'+1)\text{-}D(n/2)$ corresponding to said shift registers $Re_3$, $Re_4$ to record the data items with said subblocks $B(C_1\text{-}Re_3)$, $B(C_1\text{-}Re_4)$, and simultaneously delivering the data items to be supplied to said subblocks $B(C_2\text{-}Re_1)$, $B(C_2\text{-}Re_2)$ to said shift registers $Re_1$, $Re_2$ from other two of said memory units;

(e) driving said drivers $D_1\text{-}D(n')$ to record the data items with said subblocks $B(C_2\text{-}Re_1)$, $B(C_2\text{-}Re_2)$, and simultaneously delivering the data items to be supplied to said subblocks $B(C_2\text{-}Re_3)$, $B(C_2\text{-}Re_4)$ to said shift registers $Re_3$, $Re_4$ from said other two of memory units; and (f) driving said drivers $D(n'+1)\text{-}D(n/2)$ to record the data items with said subblocks $B(C_2\text{-}Re_3)$, $B(C_2\text{-}Re_4)$, whereby the data items can be distributed and recorded in the order of the steps (b) through (f).

* * * * *